United States Patent [19]

Cusimano

[11] Patent Number: 5,711,504
[45] Date of Patent: Jan. 27, 1998

[54] HINGED SEISMIC FOUNDATION PIER

[76] Inventor: Matt Cusimano, 267 Aptos Beach Dr., Aptos, Calif. 95003

[21] Appl. No.: 650,183

[22] Filed: May 20, 1996

[51] Int. Cl.$^6$ .................................................. F16M 13/00
[52] U.S. Cl. ...................... 248/354.3; 248/357; 254/424; 280/763.1; 52/126.6
[58] Field of Search ............................... 248/354.3, 644, 248/650, 688, 352, 357; 254/424, 418, 423, 427, DIG. 1; 280/475, 763.1, 764.1; 52/126.6, 126.7

[56] References Cited

U.S. PATENT DOCUMENTS

| | | | |
|---|---|---|---|
| 1,062,871 | 5/1913 | Aaron | 254/424 X |
| 1,740,876 | 12/1929 | Sauer | 248/357 |
| 2,090,776 | 8/1937 | Arndt | 280/763.1 X |
| 2,169,913 | 8/1939 | DeNault | 254/424 |
| 2,519,364 | 8/1950 | Fredholm | 254/424 |
| 2,976,055 | 3/1961 | Harrison | 280/763.1 |
| 3,093,362 | 6/1963 | Schaefer | 248/354.3 X |
| 3,315,973 | 4/1967 | Marple | 280/763.1 X |
| 3,332,699 | 7/1967 | Devys | 280/763.1 X |
| 3,667,730 | 6/1972 | Kollmar | 254/424 |
| 4,404,780 | 9/1983 | Josephson | 248/357 X |
| 5,421,611 | 6/1995 | Peterson et al. | 254/418 X |
| 5,595,366 | 1/1997 | Cusimano et al. | 248/354.3 |

Primary Examiner—Robert W. Gibson, Jr.
Assistant Examiner—Stephen S. Wentsler
Attorney, Agent, or Firm—Robert Charles Hill

[57] ABSTRACT

A foundation pier for supporting a movable dwelling that substantially resists environmental forces, such as seismic and wind forces, and which is semi-permanently attached to the movable dwelling, such as a mobile home or commercial coach, is provided. The invented pier includes coupling members that are attached to a support beam of the dwelling and to the pier, for securing the pier to the dwelling. The coupling members are hingably coupled together, enabling the pier to pivot relative to the support beam. The pier is pivoted against the beam when transporting the dwelling with the pier attached to the beam. A retaining member is provided for retaining the pier against the beam, to prevent the pier from accidentally contacting a ground surface when the dwelling is in transit. At an installation site, the pier is pivoted away from the beam, until it is perpendicular thereto and to the ground, for installing the dwelling. The height of the pier is then adjusted to secure the pier to the ground and support the dwelling. The coupling members may be configured with a locking device to prevent the coupling members from inadvertently pivoting. The coupling members are preferably detachably coupled together, for separating the pier from the dwelling, if it is desired. An adjustment mechanism is included for adjusting the height of the pier when installing the dwelling and when securing the pier to the retaining member.

7 Claims, 3 Drawing Sheets

HINGED SEISMIC FOUNDATION PIER

BACKGROUND OF THE INVENTION

1. Field of the Invention

The present invention relates generally to foundations for movable dwellings, such as mobile homes and commercial coaches, and more particularly, to an improved foundation pier for supporting a movable dwelling that substantially resists environmental forces, such as seismic and wind forces, and which is semi-permanently attached to the movable dwelling.

2. Description of Related Art

Movable dwellings, such as mobile homes and commercial coaches for example, typically comprise a prefabricated modular unit, that is somewhat longer than it is wide, to provide facile transportation of the unit. The unit is provided with a plurality of spatially positioned, elongated support girders or beams that extend parallel to the longitudinal axis of the unit. The support beams often have an "T" cross sectional configuration. A plurality of spatially positioned floor joists, that may have either a "J" or "C" cross sectional configuration, are supported by the beams and extend across the width of the unit. Some movable dwellings may incorporate a perimeter chassis with a beam having a "C" configuration.

Because these dwellings are movable, foundation systems incorporating piers are a preferable system for supporting the dwelling at an installation site. The foundation system is preferred, since the system can be disassembled if it is desired to move the dwelling. The piers are used in the foundation systems to aid with supporting the unit. The piers are typically placed on a ground surface of the installation site and secured to beams of the unit, for supporting the unit. The piers are usually positioned beneath a beam, at an intersection of the beam and a joist for example. Units configured with C-beams may have piers spatially positioned along the beam at predetermined intervals to support the unit. The distance between the piers may be governed by such factors as the dimensions of the unit and applicable building codes at the installation site of the unit.

Foundation piers in the prior art pier often comprise a base plate for supporting the pier on the ground of the installation site and a pair of opposing supports affixed to the base. Adjustable extensions are included for adjusting the height of the pier. The piers may include suitable means affixed to the extensions for coupling the extensions to a beam of the unit. The coupling means often comprises a platform that has upwardly extending threaded shafts. A plate is held is a desired horizontal position by the threaded shafts using well known methods. The plate is adjusted upwardly until it abuts the beam. A pair of brackets, coupled to the shafts, are placed over the bottom portion of the desired beam and tightened onto the beam, to secure the pier to the beam.

A disadvantage of foundation piers for movable dwellings in the prior art, is that the coupling means is somewhat unstable due to the length of the shafts. Excessive lateral forces applied to either the beam or the pier could cause the coupling means to fail. A further disadvantage of these piers, is that when increased forces are applied to the pier, such as seismic activity and wind forces, the extensions may shear the bolts causing the pier to fail and possibly damage the unit.

Another prior art foundation pier is disclosed in presently pending U.S. patent application Ser. No. 08/384,666, filed Feb. 6, 1995 wherein Applicant is one of the joint inventors. The pier disclosed therein is directed to supporting a movable dwelling, such as a mobile home or commercial coach. The disclosed pier includes a base plate having a threaded shaft, with a plurality of webs spatially positioned about the shaft. A support member has a first end threadably coupled to the shaft for adjusting the height of the pier. Couple members are detachably coupled to a second end of the support member. The couple members attach the pier to a support beam of the movable dwelling, to prevent movement between the pier and the dwelling. A clamp member, affixed to the plurality of webs, couples to the support member for preventing movement of the support member relative to the shaft and the clamp member. Environmental forces applied to the support member are transmitted from the clamp member and distributed through the plurality of webs to prevent the pier from collapsing.

However, a disadvantage of the disclosed pier, as well as other prior art piers, is that the pier is not at least semi-permanently attached to the unit. Since prior art piers are not semi-permanently attached to the unit, they are installed once the unit is at the desired installation site, instead of prior to transporting the unit to the site. Often, the piers are improperly installed, potentially causing the pier to fail, and thus damaging either the unit, the pier, or both.

There therefore exists a need for a movable dwelling foundation pier that resists environmental forces applied thereto due to seismic activity, wind, and the like, and which is semi-permanently attached to a moveable dwelling.

OBJECTS OF THE INVENTION

It is therefore an object of the present invention to provide an improved foundation pier for supporting a movable dwelling;

It is another object of the present invention to provide a foundation pier for supporting a movable dwelling that resists increased environmental forces, such as seismic activity and wind forces;

It is a further object of the present invention to provide a foundation pier for supporting a movable dwelling that is semi-permanently affixed to a support beam of the dwelling prior to transporting the dwelling to an installation site;

It is still another object of the present invention to provide a foundation pier for supporting a movable dwelling that does not hinder transportation of the dwelling;

It is yet a further object of the present invention to provide a foundation pier for supporting a movable dwelling that is pivotably coupled to a support beam of the dwelling so that the pier is secured to the support beam in a transportation position when transporting the dwelling, and is pivoted to an installation position when the dwelling is at an installation site;

It is still another object of the present invention to provide a foundation pier for supporting a movable dwelling that may be installed in an existing foundation system; and It is a further object of the present invention to provide a pier that may be installed by hand.

SUMMARY OF THE INVENTION

These and other objects and advantages of the present invention are achieved by providing a foundation pier for supporting a movable dwelling that substantially resists environmental forces, such as seismic and wind forces, and which is semi-permanently attached to the movable dwelling, such as a mobile home or commercial coach. In the preferred embodiment of the present invention, the pier includes a base for supporting the pier on a ground surface at an installation site. A support tube is affixed to the base. An elongated channel member has a bottom portion comprising clamp means for securing the channel to the support tube. The channel is secured to the support tube for increasing the pier's ability to resist temporarily increased environmental forces.

An elongated shaft is threadably retained in the support tube and extends upwardly therefrom. The shaft extends through the channel and is affixed to a top end thereof, for adjusting the height of the channel, and subsequently, the pier.

The invented pier includes coupling means for hingably securing the pier to the dwelling. The coupling means comprises an upper bracket member secured to the support beam and a lower bracket member affixed to the channel member. Hinge means are provided for pivotably coupling the bracket members together, enabling pivoting of the pier relative to the support beam. The bracket members and hinge means may be configured to enable the pier to pivot either parallel to the beam, or perpendicular to the beam. The hinge means are preferably detachably coupled to the brackets for separating the brackets, so that the pier may be removed from the support beam. Additionally, locking means for preventing the brackets from inadvertently pivoting relative to each other, such as when installing the pier, may be provided. The locking means are also detachable, for separating the pier from the support beam.

The coupling members are hingably coupled together, to enable the pier to pivot from a transportation position, where the base of the pier is retained adjacent to the dwelling, to an installation position, where the pier is substantially perpendicular to the support beam. The base of the pier is retained adjacent to the dwelling, when transporting the dwelling, so that the pier does not contact a ground surface, such as paved road, which could damage the pier or dwelling.

Retaining means are provided for retaining the pier against the beam while the dwelling is in transit. In the preferred embodiment, the retaining means includes a retaining plate that is attached to the support beam. The retaining plate extends obtusely away from the support beam for frictionally engaging the pier's base, when the pier is in the transportation position, to hold the base. The retaining means may additionally include a detachable coupling member for securely coupling the base to the plate, for increased safety when transporting the dwelling.

Prior to transporting the dwelling, a plurality of piers of the present invention are secured to the dwelling by first attaching the upper bracket members to the support beams of the dwelling. The retaining means are also attached to the beams at a predetermined distance from the upper brackets. The lower brackets are then coupled to the upper brackets with the hinge means for securing the piers to the beams. Each pier is then pivoted toward the dwelling, until the base is aligned with the retaining plate. The shaft is adjusted to increase the height of the pier, until the base frictionally engages the plate, to hold the pier above the ground. The coupling member may then be secured to the base and plate, to securely couple the base to the plate. Thus, the pier is attached to the dwelling, when transporting the dwelling to an installation site.

Once the dwelling is at the installation site, the piers are pivoted to the installation position, by first removing the coupling members from each base and plate. The shaft is adjusted to decrease the height of the pier, so that the base is released from the plate. The base of each pier is pivoted away from the beam and toward the ground, until it is in the installation position, extending somewhat perpendicularly between the beam and ground. The locking means may then be installed to prevent the pier from inadvertently pivoting relative to the beam. The shaft of each of the piers is then adjusted to increase the height of the pier, until the base is against the ground, for securing the pier to the ground and supporting the dwelling. The clamp means of the channel are then tightened about the support member, to aid with supporting the dwelling and for increasing the pier's ability to resist temporarily increased environmental forces, such as seismic activity and wind forces.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
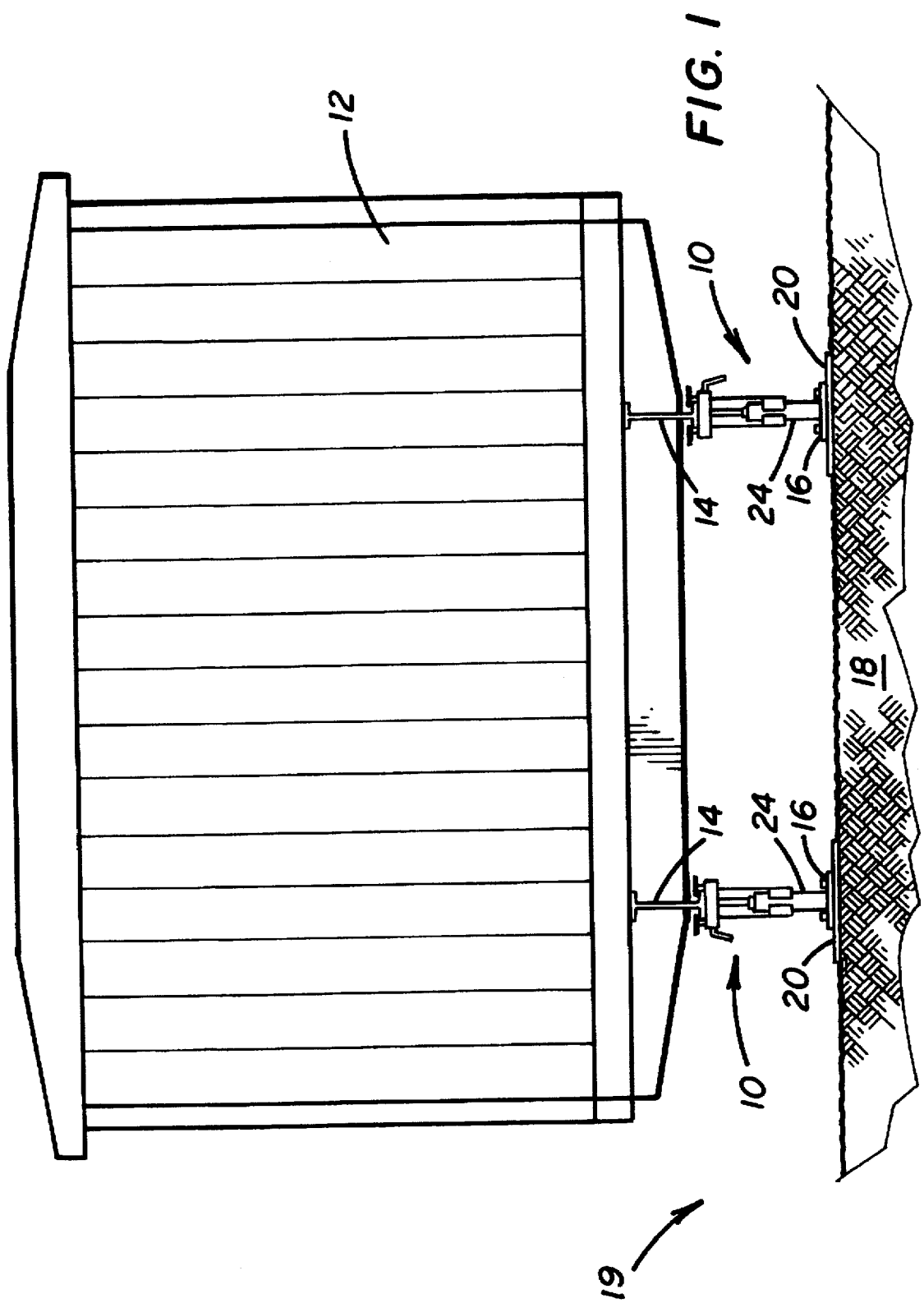
FIG. 1 is a front elevational view showing a movable dwelling supported by a plurality of foundation piers constructed according to a preferred embodiment of the present invention.

Referring now to FIG. 1 of the drawings, there is shown generally at 10, a preferred embodiment of a foundation pier for supporting a movable dwelling, such as a commercial coach 12. The pier 10 is semi-permanently attached to the coach 12, when the coach 12 is fabricated, for example. The invented pier 10 is configured to preferably resist substantial temporary increases in environmental forces, such as seismic and wind forces and comprises a hardened steel alloy. A multiplicity of the piers 10 are attached to support beams 14 of the coach 12 for supporting the coach 12, at predetermined spatial intervals. The distance between the piers 10 can depend upon several factors including, dimensions of the coach 12 to be supported, whether the piers 10 are being installed in an existing foundation system or in new foundation system, and the building codes and requirements in force at the installation site.

Referring now to the drawing Figures, the pier 10 of the present invention, includes a rectangular base plate 16 for supporting the pier on a ground surface 18 at an installation site 19. A foundation pad 20 may be attached to the base 16, to aid with supporting the base 16 on the ground 18. The foundation pad 20 preferably is dimensioned somewhat larger than the base 16 for supporting the base 16 and may comprise one or portions of a suitable pressure treated plywood laminate, for example. Bolts 22 may be provided for attaching the pad 20 to the base 16.

An elongated hollow support tube 24 is affixed to the base 16, using known means such as welding. The tube 24 extends perpendicularly away from the base 16 and is preferably cylindrical to aid with the pier's ability to resist substantial temporary increases in environmental forces.

An elongated U-shaped channel member 26 is dimensioned to extend about the outer periphery of the tube 24. The channel 26 has a bottom portion comprising clamp means 28 disposed about the support tube 24 and a top end 30. The clamp means 28 comprises opposing clamp portions 32 that receive the support tube 24 therebetween. Nut-bolt combinations 34 are disposed through openings (not shown) in the clamp portions 32. The nut-bolt combinations 34 are adjusted for either tightening the clamp means 28 on the tube 24, or for loosening the clamp means 28 from the tube, when adjusting the height of the pier 10, for example.

An elongated threaded shaft 36 is threadably retained in an upper end 38 of the support tube 24. The tube 24 may include an annular threaded insert 40 (not clearly shown), as disclosed in presently pending U.S. patent application Ser. No. 08/384,666. The insert 40 is press-fit into the upper end 38 of the tube 24 and is threaded and dimensioned complementary to the shaft 36. The shaft 36 extends through the channel 26 and is affixed to the top end 30 thereof for coupling the tube 24 to the channel 26. The shaft 36 is threaded through the tube 24, for adjusting the height of the channel 26, and thus, the pier 10. A nut 37 is threaded on the shaft 36, for maintaining the shaft 36 at different desired heights.

Referring still to the drawing Figures the invented pier 10 includes coupling means, shown generally at 42, for hingably securing the pier 10 to the support beam 14 of the coach 12. In the preferred embodiment, the coupling means 42 comprises an upper bracket member 44 that is secured to the support beam 14 and a lower bracket member 46 integrally affixed to the top end 30 of the channel member 26 and to the shaft 36. The brackets 44, 46 are somewhat C-shaped in cross sectional configuration, with the lower bracket 46 dimensioned to reside in the upper bracket 44. The upper bracket 44 is attached to the support beam 14 using known means. Preferably, the upper bracket 44 is attached to the support beam 14 with nut-bolt combinations 48, however the bracket 44 can be attached to the beam 14 by welding or other appropriate means.

Hinge means are provided for pivotably coupling the brackets 44, 46 together, to enable pivoting of the pier 10 relative to the support beam 14. The hinge means are preferably detachably coupled to the brackets 44, 46 for separating the brackets 44, 46, so that the pier 10 may be removed from the beam 14. The hinge means preferably comprise a first pin member 50A that is configured to extend through a first set of aligned apertures 52A, 52B in each of the brackets 44, 46. The sets of apertures 52A, 52B are formed through sides 54A, 54B of the upper and lower brackets 44, 46, respectively, and adjacent a first end 56 of each of the brackets 44, 46. The pin 50A may include a cotter pin 58 to prevent the pin 50A from inadvertently detaching from the brackets 44, 46. In the preferred embodiment, the coupling means 42 is configured to enable the pier 10 to pivot parallel to the beam 14.

However in an alternative embodiment, the brackets 44, 46 and hinge means may be easily configured to enable the pier to pivot perpendicular to the beam 14, and retaining means for coupling the pier's base 16 to an underside of the dwelling may be provided. The alternative embodiment may be provided when greater ground clearance is desired between the beam 14 and ground surface 18, for example.

Additionally, the hinge means may include locking means for preventing the brackets 44, 46 from inadvertently pivoting relative to each other. In the preferred embodiment, the locking means comprises a second set of aligned apertures 60A, 60B that are formed through the sides 54A, 54B of the upper and lower brackets 44, 46 and adjacent a second end 62A, 62B of each of the brackets 44, 46. A second pin member 50B is adapted to be disposed through the second sets of apertures 62A, 62B for locking the brackets 44, 46 together. The pin member 50B is detachable, so that the pier 10 can be separated from the beam 14.

Figure 2:
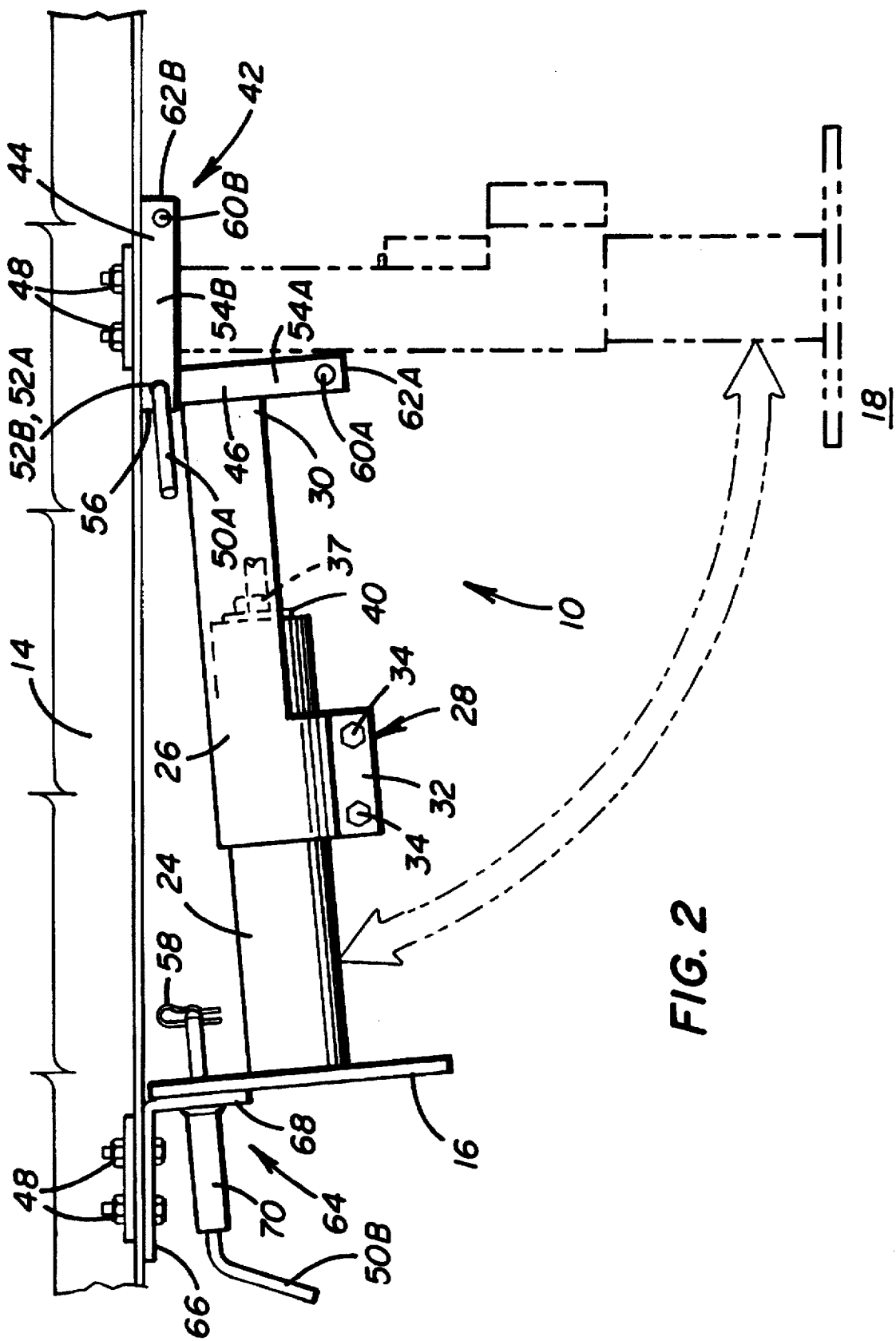
FIG. 2 is a side elevational view showing the preferred embodiment of the invented pier pivotably coupled to a support beam of the dwelling.

Referring now to FIG. 2 of the drawings, the preferred embodiment of the invented foundation pier 10 is provided with retaining means, shown generally at 64, for retaining the pier 10 against the beam 14. The retaining means 64 are provided to prevent the pier 10 from accidentally pivoting while the coach 12 is in transit and for retaining the pier 10 above the ground 18, when transporting the coach 12. Preferably, the retaining means 64 includes a substantially L-shaped bracket 66 that is attached to the beam 14 using known means, such as nut-bolt combinations 48 for example. The bracket 66 has a retaining plate 68 that extends obtusely away from the beam 14 toward the ground 18. The plate 68 is substantially planar for frictionally engaging the pier's base 16, when the pier 10 is in a transportation position, as shown in the Figure.

The retaining plate 68 may further be configured for detachably securely coupling the base 16 to the plate 68, for increased safety when transporting the coach 12. An elongated cylindrical sleeve 70 is affixed to the plate 68 and aligned with an opening (not shown) formed therethrough. Additionally, the base 16 has an opening formed therethrough (also not shown), configured to align with the opening and sleeve 70 of the plate 68. The second pin member 50B is dimensioned to extend through the sleeve 70 and openings in the plate 68 and base 16, for detachably coupling the base 16 to the retaining means 64. The sleeve 70 is provided to reduce lateral forces transmitted to the pin 50B by the base 16 and plate 68.

Referring again to the drawing Figures, prior to transporting the coach 12 to an installation site 19, a plurality of the piers 10 of the present invention are secured to the coach 12. The piers 10 are secured to the coach 12 by first attaching the upper bracket members 44 to the support beams 14. The retaining means 64 are also attached to the beams 14 at a distance from the upper brackets 44, determined by the length of the pier 10. The first ends 56 of the brackets 44, 46 are aligned, with the first sets of apertures 52A, 52B of each of the brackets 44, 46 in alignment. The first pin 50A is then disposed through the sets of apertures 52A, 52B for hingably coupling the brackets 44, 46, and thus securing the piers 10 to the beams 14. The base 16 of each pier 10 is then pivoted toward the beam 14, until the base 16 is aligned with the retaining plate 68, with the openings in the base 16 and plate 68 in alignment.

The shaft 36 is then threaded through the insert 40 for increasing the height of the pier 10. The shaft 36 is threaded until the base 16 frictionally engages the plate 68, to hold the pier 10 above the ground 18. The second pin 50B is then disposed through the sleeve 70 and extended through the openings in the plate 68 and base 16. A cotter pin 58 is then secured to the pin 50B, to prevent the pin 50B from inadvertently detaching from the base 16 and plate 68. Thus, the base 16 is securely coupled to the plate 68, when transporting the coach 12.

Figure 3:
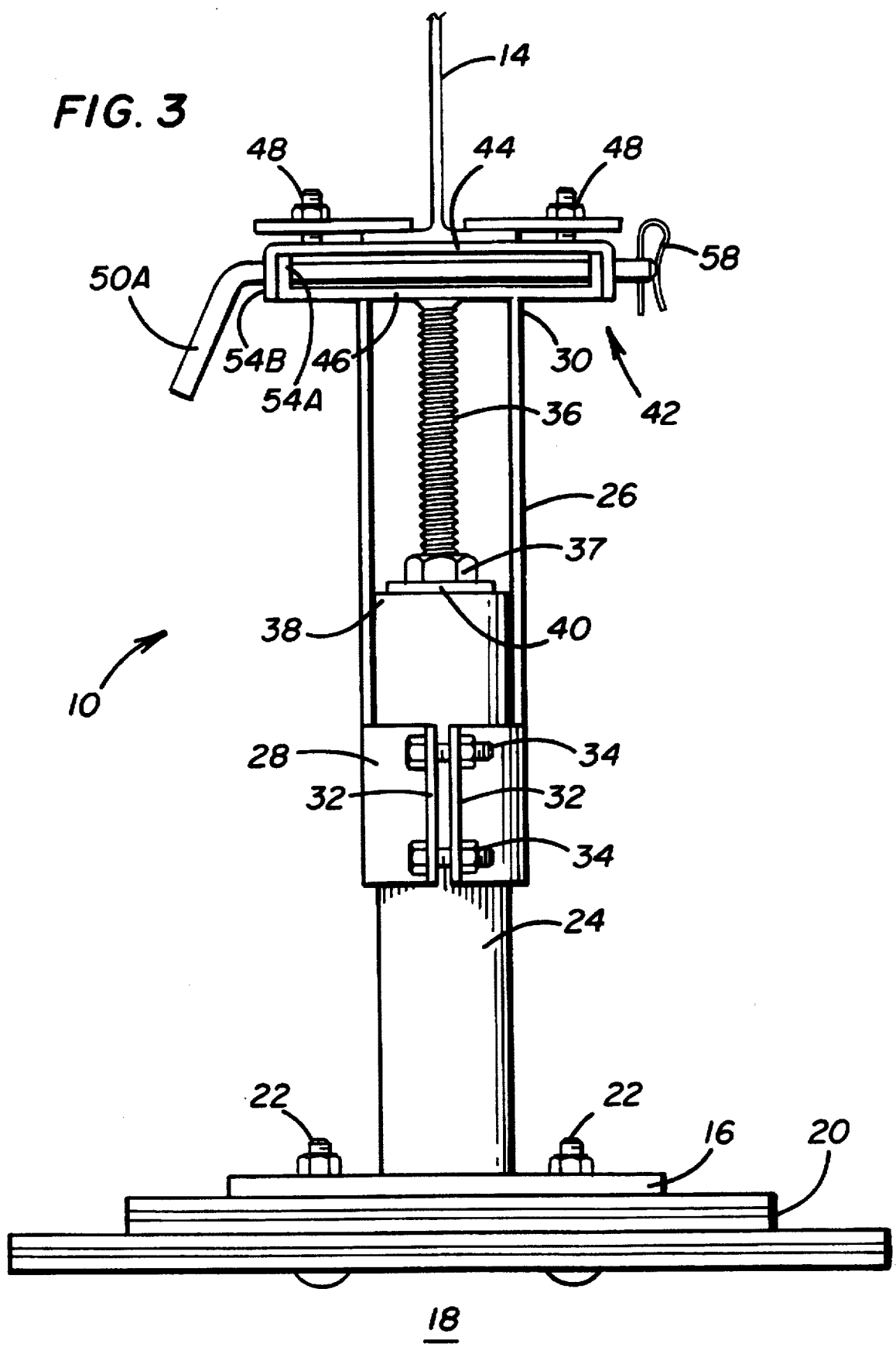
FIG. 3 is a front elevational view of the preferred embodiment of the present invention.

Once the coach 12 is at the installation site 19, the piers 10 are pivoted to the installation position, shown in FIGS. 1 and 3 (and in phantom in FIG. 2), by first removing the pin 50B from each base 16, plate 68, and sleeve 70. The shaft 36 is adjusted to decrease the height of the pier 10, so that the base 16 is slowly released from the plate 68. The base 16 of each pier 10 is pivoted away from the beam 14 and toward the ground 18, until the pier 10 is in the installation position, where the pier 10 extends somewhat perpendicularly between the beam 14 and ground 18. The second sets of apertures 60A, 60B are then aligned, and the second pin 50B is disposed through the apertures 60A, 60B for locking the brackets 44, 46 together.

The shaft 36 of each pier 10 is then adjusted to increase the height of the pier 10, until the base 16 is against either the ground 18, or foundation pad 20 if provided. The pier's base 16 is then secured to the pad 20 or ground 18 for supporting the coach 12. The clamp means 28 of the channel 26 are then tightened about the support tube 24 to couple the channel 26 to the tube 24, to aid with supporting the coach 12 and for increasing the pier's ability to resist increased environmental forces, such as seismic activity and wind forces.

Thus, there has been described an improved foundation pier for supporting a movable dwelling that substantially resists environmental forces, such as seismic and wind forces, and which is semi-permanently attached to the movable dwelling. The invented pier is hingably coupled to a support beam of the dwelling, enabling the pier to pivot relative to the support beam. The pier is pivoted against the beam when transporting the dwelling and pivoted away from the beam when installing the dwelling so that the pier is always attached to the beam, if desired.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A foundation pier semi-permanently secured to a support beam of a movable dwelling for supporting the dwelling and for resisting temporarily increased environmental forces applied to the dwelling and to the pier, the pier comprising:

a base having an opening disposed therethrough;

an upstanding support member affixed to the base;

means for adjusting the height of the pier, the adjusting means including a shaft adjustably retained in the support member and an elongated channel member, the channel member having a first end affixed to the shaft for adjusting the height of the channel and clamp means disposed about the support member for securing the channel to the support member to retain the pier at different predetermined heights and for resisting temporarily increased environmental forces applied to the dwelling and to the pier;

coupling means for securing the pier to the support beam, the coupling means including an upper bracket member secured to the support beam and a lower bracket member affixed to the first end of the channel member, the coupling means including hinge means for pivotably coupling the bracket members together to enable pivoting of the pier relative to the support beam;

retaining means for retaining the pier above a ground surface while transporting the dwelling, the retaining means including a retaining plate with an aperture and extending obtusely away from the support beam and attached thereto, the adjustment means being adjusted for increasing the height of the pier, such that the base frictionally engages the retaining plate to retain the pier above the ground surface while transporting the dwelling, and the adjusting means being adjusted for decreasing the height of the pier to release the base from the retaining plate, enabling pivoting of the pier away from the support beam to the ground surface at an installation site for installing the dwelling at the site; and a coupling member dimensioned to extend through the aperture of the retaining plate and the opening through the pier base, such that when the base is frictionally engaged by the retaining plate and the aperture and opening are aligned, the coupling member resides in the aperture and opening to detachably couple the base to the plate for preventing inadvertent movement therebetween while transporting the dwelling, the coupling member removed from the aperture and opening to pivot the pier away from the support beam to the ground at the installation site for installing the dwelling.

2. The pier of claim 1 wherein the coupling means further comprises:

the hinge means comprising a pivot pin extending through a pair of apertures formed in a first end of each of the brackets for hingably coupling the brackets together, the pivot pin detachably coupled to the brackets for separating the brackets to enable removal of the pier from the support beam; and locking means for preventing the brackets from inadvertently pivoting relative to each other, the locking means comprising a pair of apertures formed through a second end of each of the brackets and a detachable locking member adapted to extend through the apertures in the second end thereof to couple the brackets together for preventing the brackets from pivoting.

3. The pier of claim 1 further comprising a foundation pad attached to the base, the foundation pad having a length and a width greater than a length and a width of the base for supporting said base above the ground surface.

4. The pier of claim 1 wherein the pier comprises hardened steel alloy.

5. A foundation pier for a movable dwelling semi-permanently secured to a support beam of the movable dwelling for supporting the dwelling and for resisting temporarily increased environmental forces applied to the dwelling and to the pier, the pier comprising:

a base including means for securing the pier to a ground surface;

a hollow upstanding support tube having a first end affixed to the base plate;

an elongated channel member having a bottom portion disposed about the support tube and a top end, the bottom portion comprising clamp means for securing the channel to the support tube to retain the channel at different predetermined heights and for resisting temporarily increased environmental forces applied to the dwelling and to the pier;

an elongated shaft threadably retained in a second end of the support tube and extending upwardly therefrom, the shaft extending through the channel member and affixed to the top end thereof for adjusting the height of the pier;

coupling means for securing the pier to the support beam, the coupling means including an upper bracket attached to the support beam and a lower bracket affixed to the top end of the channel, the coupling means including a pivot pin extending through a first end of each of the brackets for hingably coupling the brackets together, the pivot pin detachably coupled to the brackets for separating the brackets to enable removal of the pier from the support beam;

retaining means for retaining the pier above the ground surface while transporting the dwelling, the retaining means including a retaining plate extending obtusely away from the support beam and attached thereto, whereby the pier is pivoted toward the support beam and the shaft is adjusted for increasing the height of the pier so that the base frictionally engages the retaining plate to retain the pier above the ground surface while transporting the dwelling, and the shaft is adjusted for decreasing the height of the pier to release the base from the retaining plate to pivot the pier away from the support beam until the pier is perpendicular thereto and to the ground surface for installing the pier and dwelling at an installation site; and wherein the retaining means further comprises an aperture formed in the retaining plate, an opening disposed through the base of the pier, and a coupling member dimensioned to extend through the aperture and opening, such that when the base is frictionally engaged by the retaining plate and the aperture and opening are aligned, the coupling member resides in the aperture and opening to detachably couple the base to the plate for preventing inadvertent movement therebetween while transporting the dwelling, the coupling member removed from the aperture and opening to pivot the base of the pier away from the support beam to the ground surface at the installation site for installing the dwelling.

6. The pier of claim 5 wherein the coupling means further comprises locking means for preventing the brackets from inadvertently pivoting relative to each other, the locking means comprising a pair of apertures formed through a second end of each of the brackets and a detachable locking member adapted to extend through the apertures in the second end thereof to couple the brackets together for preventing the brackets from pivoting.

7. The pier of claim 5 further comprising a foundation pad attached to the base, the foundation pad having a length and a width greater than a length and a width of the base for supporting the base above the ground surface.

* * * * *